(12) United States Patent
Narasimha et al.

(10) Patent No.: US 10,452,592 B1
(45) Date of Patent: Oct. 22, 2019

(54) MESSAGE BUS-BASED STREAMING RULES ENGINE

(71) Applicant: Glassbeam, Inc., Santa Clara, CA (US)

(72) Inventors: Bharadwaj Narasimha, Bangalore (IN); Ashok Agarwal, San Jose, CA (US)

(73) Assignee: Glassbeam, Inc., Santa Clara, CA (US)

( * ) Notice: Subject to any disclaimer, the term of this patent is extended or adjusted under 35 U.S.C. 154(b) by 0 days.

(21) Appl. No.: 16/107,553

(22) Filed: Aug. 21, 2018

Related U.S. Application Data

(60) Provisional application No. 62/549,342, filed on Aug. 23, 2017.

(51) Int. Cl.
*G06F 13/42* (2006.01)
*G06N 5/02* (2006.01)

(52) U.S. Cl.
CPC ............. *G06F 13/42* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 9,984,684 B1 * | 5/2018 | Uszkoreit | G10L 15/1822 |
| 2012/0197914 A1 * | 8/2012 | Harnett | G06F 16/332 707/755 |
| 2015/0261955 A1 * | 9/2015 | Huang | G06F 21/562 726/23 |
| 2018/0069896 A1 * | 3/2018 | Urmanov | H04L 63/1483 |

\* cited by examiner

*Primary Examiner* — Idriss N Alrobaye
*Assistant Examiner* — Dayton Lewis-Taylor
(74) *Attorney, Agent, or Firm* — Van Pelt, Yi & James LLP

(57) ABSTRACT

A message bus-based streaming rules engine is disclosed. In various embodiments, a data analysis system as disclosed herein includes a communication interface configured to receive log data; and a processor coupled to the communication interface and configured to: parse the log data to generate a data unit comprising a data value; and send the data unit via a message bus to a rule actor configured to apply a rule based at least in part on the data value.

20 Claims, 5 Drawing Sheets

MESSAGE BUS-BASED STREAMING RULES ENGINE

CROSS REFERENCE TO OTHER APPLICATIONS

This application claims priority to U.S. Provisional Patent Application No. 62/549,342 entitled MESSAGE BUS-BASED STREAMING RULES ENGINE filed Aug. 23, 2017 which is incorporated herein by reference for all purposes.

BACKGROUND OF THE INVENTION

Automated processes generate a variety of unstructured and semi-structured data. For example, complex software and products and hardware systems and devices typically generate "logs" of operating data on a regular basis, e.g., hourly, daily, etc., or in the case of streams continuously, in real time. Logs may include machine data generated by an application or the software and/or hardware infrastructure used to run the application. Logs may comprise a record of all the events that happened in an application and/or other system. They typically include unstructured or semi-structured information and often contain common parameters such as a time stamp, a serial number or other identifier, and IP or other address, process identifiers, etc. Logs may be provided in the form of files, streams, bundles, emails, messages, or other forms.

For manufacturers and/or users of a large installed base, it may be difficult to receive, process, store, and make use of log data, e.g., to detect, analyze, and predict bugs or other failures; to analyze performance; etc.

BRIEF DESCRIPTION OF THE DRAWINGS

Various embodiments of the invention are disclosed in the following detailed description and the accompanying drawings.

DETAILED DESCRIPTION

Figure 1:
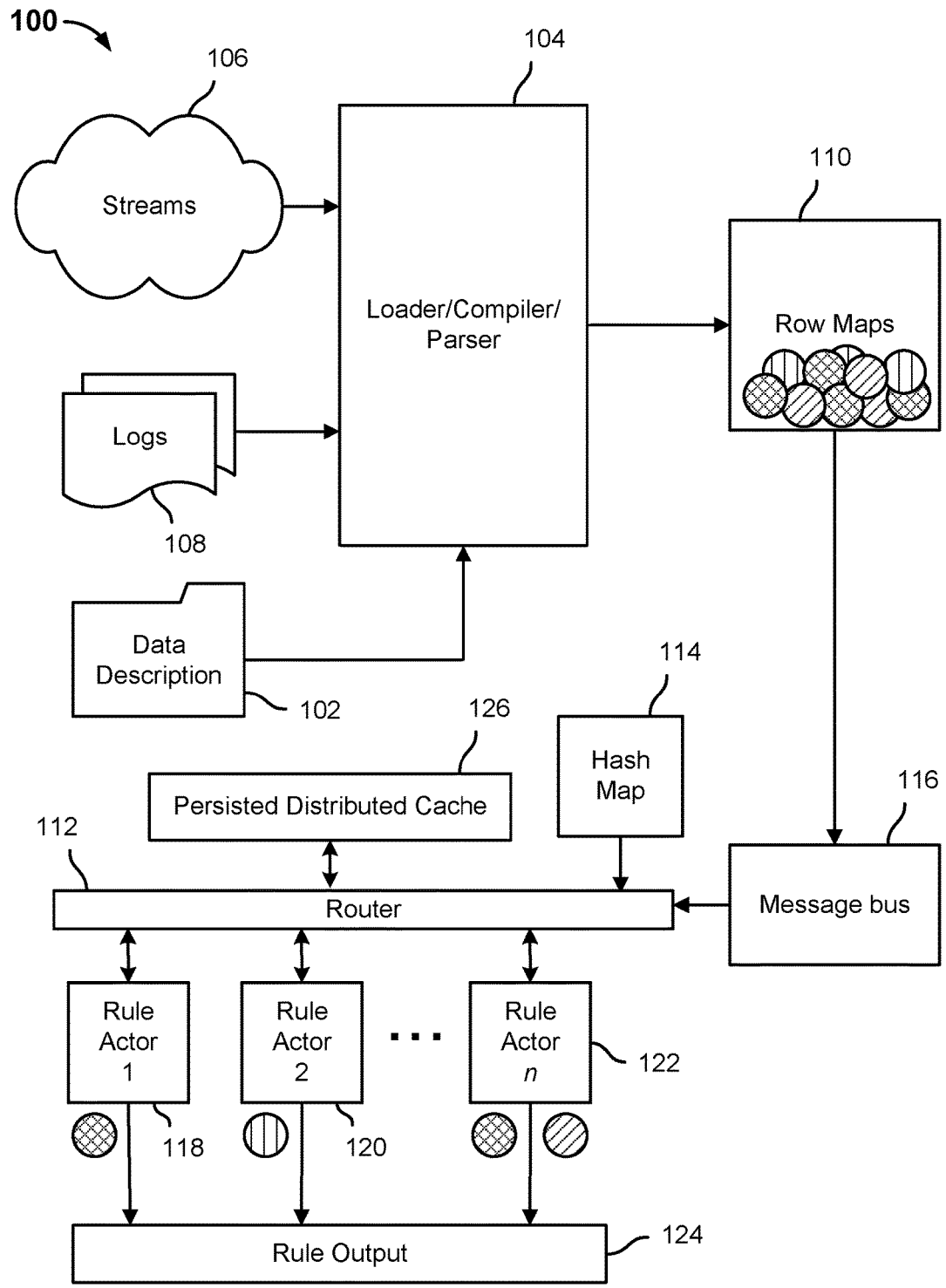
FIG. 1 is block diagram illustrating an embodiment of a data analysis system comprising a message bus-based streaming rule engine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A message bus-based rules engine to process log data and similar files and/or streams of unstructured/semi-structured content is disclosed. In various embodiments, rules and alerts are implemented via a message bus-based streaming rules engine which applies the rules as data streams are processed. In various embodiments, rules are implemented and triggered using Finite State Machines (FSM) and are evaluated in parallel. In some embodiments, rules are defined on attributes currently being parsed by a framework, which compiles a rule asynchronously into an executable class +actor structure. The resulting "rule actors" may be used to apply business rules to an arbitrary log file or a message bus-based stream, such as the Glassbeam SCALAR Platform and/or as disclosed in U.S. Pat. No. 9,830,368, entitled ASYNCHRONOUS PARALLEL PROCESSING OF LOG DATA, issued Nov. 28, 2017, the entire contents of which are incorporated herein by reference for all purposes.

In various embodiments, the rules are defined using a domain specific language (DSL). In some embodiments, the DSL is implemented using the Scala programming language. In some embodiments, an external DSL may be used by a user to define a rule. The external representation may be converted to an internal representation, e.g., one comprising or approaching more fully the full Scala programming language. The internal representation is compiled to provide an executable class +actor structure to implement the rule, as disclosed herein.

FIG. 1 is block diagram illustrating an embodiment of a data analysis system comprising a message bus-based streaming rule engine. In the example shown, data analysis system 100 receives as input a data description 102 provided to a loader/compiler/parser (LCP) 104. In various embodiments, data description 102 comprises a description, in a domain specific language (DSL), of the content, format, syntax, semantics, etc. of log data or other unstructured or semi-structured data comprising data streams 106 and/or log (or other) files 108.

In some embodiments, log data is loaded and parsed as disclosed in U.S. Pat. No. 9,830,368, entitled ASYNCHRO- NOUS PARALLEL PROCESSING OF LOG DATA, issued Nov. 28, 2017, the entire contents of which are incorporated herein by reference for all purposes.

In some embodiments, data description 102 is expressed in a parsing language called "SPL", short for "Semiotic Parsing Language", developed and commercialized by Glassbeam, Inc. Using SPL, a developer can describe an arbitrary (structured, semi-structured or unstructured) document in terms of iconic representations as well as syntactic constraints, map document sections and components to staging tables, describe document element semantics with respect to an object-relational model, transform the staging tables into source relations suitable for populating a relational database according to the object-relational model, embed these semantics into a relational database both through the creation of a relational model and the population of metadata tables, and load the data from the document into the relational database. SPL combines syntactic parsing, relational modeling, semantic description, and ETL (Extract, Transform, and Load) development processes into a unified whole.

While in some embodiments described in detail herein Glassbeam, Inc.'s SPL is used, in other embodiments other description languages that enable the structure and/or content of an arbitrary document, and/or database tables or other data structures to store data comprising such documents, to be described in a manner usable by an interpreter, compiler, and/or other component to programmatically create database tables and/or other data structures to store and provide access to document data and/or to parse such documents to extract, transform (if needed), and load document data into such tables and/or other data structures, may be used.

Referring further to FIG. 1, in various embodiments LCP 104 compiles data description 102 to generate a plurality of "actor" entities, each configured to parse corresponding portions of data streams 106 and/or log files 108. In various embodiments, actors are lightweight, immutable processes each with their own message queue (mailbox). Actors interact with the outside world by passing and receiving messages. Messages are queued in the actor's mailbox in the order received, and the next message will be processed when the current message is completed. In various embodiments, actors are configured to parse log data to generate and provide as output one or more "row maps" 110. In various embodiments, each "row map" comprises a row event/message that associates each of one or more log data values extracted from the line of log data with a corresponding column identifier.

In the example shown in FIG. 1, data analysis system 100 further includes a router 112 configured via a hash map 114 to route each row map 110, each represented in FIG. 1 by a circle with corresponding fill, sent via message bus 116, to respective rule actors, represented in FIG. 1 by rule actors 118, 120, and 112, that have registered an interest in that row map. For example, a rule actor may have registered interested in (subscribed to receive messages associated with) row maps that have a given attribute, e.g., by name, context, and/or value.

In various embodiments, rule actors, such as rule actors 118, 120, and 122, are configured to receive and process log data, e.g., row maps 110, asynchronously and in parallel with other actors in the system. For example, a plurality of rules may be applied to a row of log data by different rule actors at the same time, and/or multiple instances of a same rule actor may operate in parallel on different row maps.

In various embodiments, rule actors 118, 120, and 122 are instantiated by LCP 104 based on a rule definition. In various embodiments, the rules are defined using a domain specific language (DSL). In some embodiments, the DSL is implemented using the Scala programming language. In some embodiments, an external DSL may be used by a user to define a rule. The external representation may be converted to an internal representation, e.g., one comprising or approaching more fully the full Scala programming language. The internal representation is compiled to provide an executable class +actor structure to implement the rule.

Referring further to FIG. 1, in some embodiments, LCP 104 compiles rule definitions asynchronously, each into an executable class +actor structure. The resulting "rule actors" (e.g., 118, 120, and 122) are used to apply corresponding business rules to an arbitrary log file or a message bus-based stream data, e.g., row maps 110 in the example shown.

In various embodiments, a rule definition includes a definition of the values needed to evaluate the rule and the conditions to trigger the rule. For example, a rule definition may indicate that it applies to computer systems of a certain make, type, etc., and requires the CPU usage attribute to be evaluated to determine whether an alert threshold has been satisfied. If so, an alert defined in the rule definition is generated. Each rule definition is compiled to define a rule actor and to configure router 112 to route to that rule actor those row maps 110 that contain values of interest to that rule actor. In some embodiments, LCP 104 compiles rule definitions, including by configuring router 112 to route row maps by creating/updating for each compiled rule a corresponding one or more row map signatures associated with that rule. In some embodiments, the row map signatures and associated rule actors are stored in hash map 114.

In the example shown in FIG. 1, each rule actor, e.g., rule actors 118, 120, and 122, is configured to provide a corresponding one or more rule outputs 124, e.g., upon the rule being triggered (e.g., conditions to trigger have been determined to have been met). Examples of rule outputs 124 include, without limitation sending an email or other notification, storing associated row map data persistently, forwarding the row map to another system or process, providing an alert, prompt, or other data to another rule actor, etc. In various embodiments, for each rule actor the corresponding rule output(s) 124 is/are defined in the rule definition.

In various embodiments, a rule may require access to previously-received and processed data from data streams 106 and/or files 108 and/or to values (e.g., running averages) computed based on and/or otherwise derived from previously-received data. For example, a rule may be triggered if a prescribed number of specific events have occurred within a temporal or other scope, e.g., within that last 30 days. Or, a rule may be triggered if a value exceeds 120% of the running average for the value as observed over the past week, e.g., for the same system, model, etc. In the example shown in FIG. 1, previously-received and processed data, rule outputs 124, context data, etc. that may be required by a rule actor (e.g., 118, 120, and 122) is stored in persisted distributed cache 126 and is accessed via router 112. In various embodiments, rule actors (e.g., 118, 120, and 122) are configured, e.g., by LCP 104 or another entity, to store in persisted distributed cache 126 data that may be required by the same or another instance of that rule actor and/or by another rule actor.

Figures 2, 3:
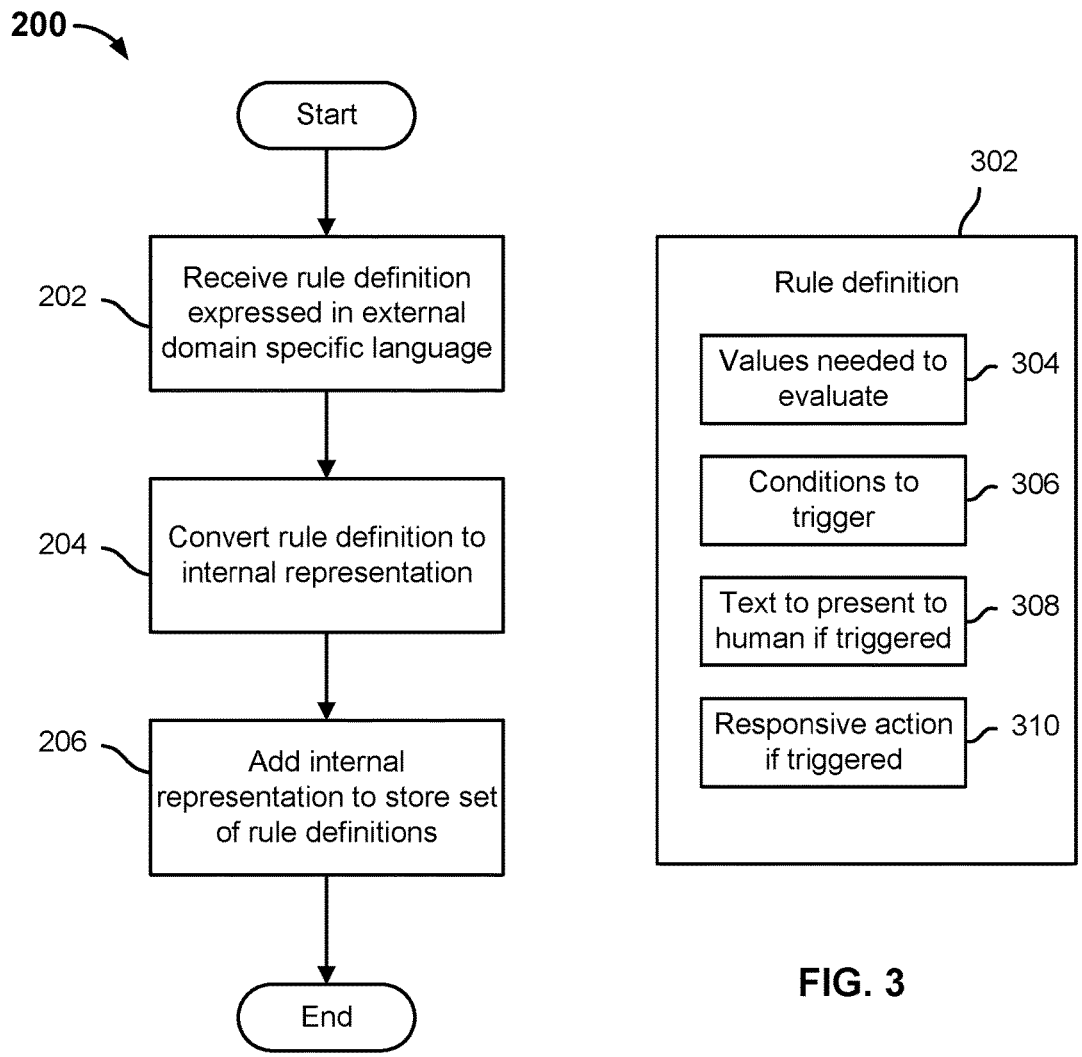
FIG. 2 is a flow chart illustrating an embodiment of a process to receive and store a rule definition.
FIG. 3 is block diagram illustrating an example of rule definition in an embodiment of a data analysis system comprising a message bus-based streaming rule engine.

FIG. 2 is a flow chart illustrating an embodiment of a process to receive and store a rule definition. In various embodiments, the process 200 of FIG. 2 is performed by a computer. In some embodiments, the process 200 is performed by a loader/compiler/parser, such as LCP 104 of FIG. 1. In the example shown, a rule definition expressed in an external domain specific language (DSL) is received (202). In various embodiments, the rule definition may be received via a graphical or other user interface. For example, a user interface may display a list of named attributes associated with a given set of data, e.g., a row, file, stream portion, etc. and a set of rule operators. A user may use the interface to define the rule, e.g., by selecting an attribute (e.g., CPU usage), selecting an operator (e.g., ">"), and specifying (e.g., by keyboard or other manual input) a triggering value (e.g., "90%"). The external DSL in some embodiments is a scaled down or limited version of a programming language, such as SCALA. The limited version and/or the graphical or other user interface in various embodiments enables a less sophisticated user to define a rule using plain language or other easily understood expressions.

In various embodiments, the rule definition includes text to be presented to a human user in the event the rule is triggered. In addition, one or more responsive actions to be taken in response to the rule being triggered are defined.

Referring further to FIG. 2, the received rule definition expressed in the external DSL is converted to an internal representation, e.g., an internal DSL (204). In some embodiments, the internal DSL is the full SCALA programming language. In various embodiments, converting the rule definition to the internal representation enables a more precise, complete, and/or efficient representation and/or implementation of the rule (e.g., as compiled) to be generated. In some embodiments, a rule may be defined initially in the internal DSL and steps 202 and 204 of process 200 collapse into a single step of receiving a rule definition expressed in the internal (or sole) DSL. For example, a consultant, contractor, etc., may write the rule definition in the internal DSL.

The internal representation of the rule is stored in a set of rule definitions (206). In some embodiments, the rule definition is not compiled until a set of data with which the rule is or may be associated is received. This just-in-time compilation in some embodiments ensures that only the most current set of rules and/or the most updated version of each is used to process data as it is received (e.g., streams 106 and/or files 108 in FIG. 1).

The following is an example of a rule and its corresponding external DSL and internal DSL representations, as implemented in various embodiments:
Rule:
Show datapath tunnel table :: Decaps or Encaps more than 100 times the average
    External DSL:
    {dp_tunneltable.dptuntb_encaps}
>100*AVG{dp_tunneltable.dptuntb_encaps} OR {dp_tunneltable.dptuntb_decaps}
>100*AVG{dp_tunneltable.dptuntb_decaps}
    col0
    var encap=ListBuffer[Int]( )
    var decap=ListBuffer[Int]( )
    var dptuntb_encaps=0
    var dptuntb_decaps=0
    col1
    encap=ListBuffer[Int]( ) decap=ListBuffer[Int]( )
    col2
    dptuntb_encaps=getColVal[Int]("dp_tunneltable.dptuntb_encap s")
    dptuntb_decaps=getColVal[Int]("dp_tunneltable.dptuntb_ decap s")
    encap+=dptuntb_encaps
    encap+=dptuntb_decaps
    col3
    val encapCnt=encap.filter(ele=>ele!=0)
    val decapCnt=decap.filter(ele=>ele!=0)
    val encapsAvg=if (encapCnt.length>0) (encap.sum/encapCnt.length)*100 else 0
    val decapsAvg=if (decapCnt.length>0) (decap.sum/decapCnt.length)*100 else 0
    encap.zip(decap).map(ele=>
    if (ele._1>encapsAvg||ele._2>decapsAvg)
{
    val temp=HashMap[String, String]("dp_tunneltable.dptuntb_encaps" ->ele._1.toString,
    "dp_tunneltable.dptuntb_decaps" ->ele._2.toString)
    persist(temp)})

FIG. 3 is block diagram illustrating an example of rule definition in an embodiment of a data analysis system comprising a message bus-based streaming rule engine. In various embodiments, a rule definition such as rule definition 302 is received at step 202 of FIG. 2. In the example shown, rule definition 302 includes a definition of a set of one or more values 304 needed to evaluate or apply the rule (e.g., "CPU usage"); a definition of one or more conditions 306 to trigger the rule (e.g., ">90%"); text 308 to be presented to a human user in response to the rule being triggered (e.g., a text message, email, etc.); and a definition of one or more responsive actions 310 to be taken in response to the rule being triggered.

In various embodiments, rule definition 302 may include a definition of a scope within which the rule is to be evaluated (e.g., within 24 hours, more than 50% of the time within a given hour). Rule definition 302 may define a compound rule that requires multiple conditions to be satisfied to trigger the responsive action, optionally within a prescribed scope (e.g., CPU usage>90% and memory usage>50% within 60 minutes).

Figure 4:
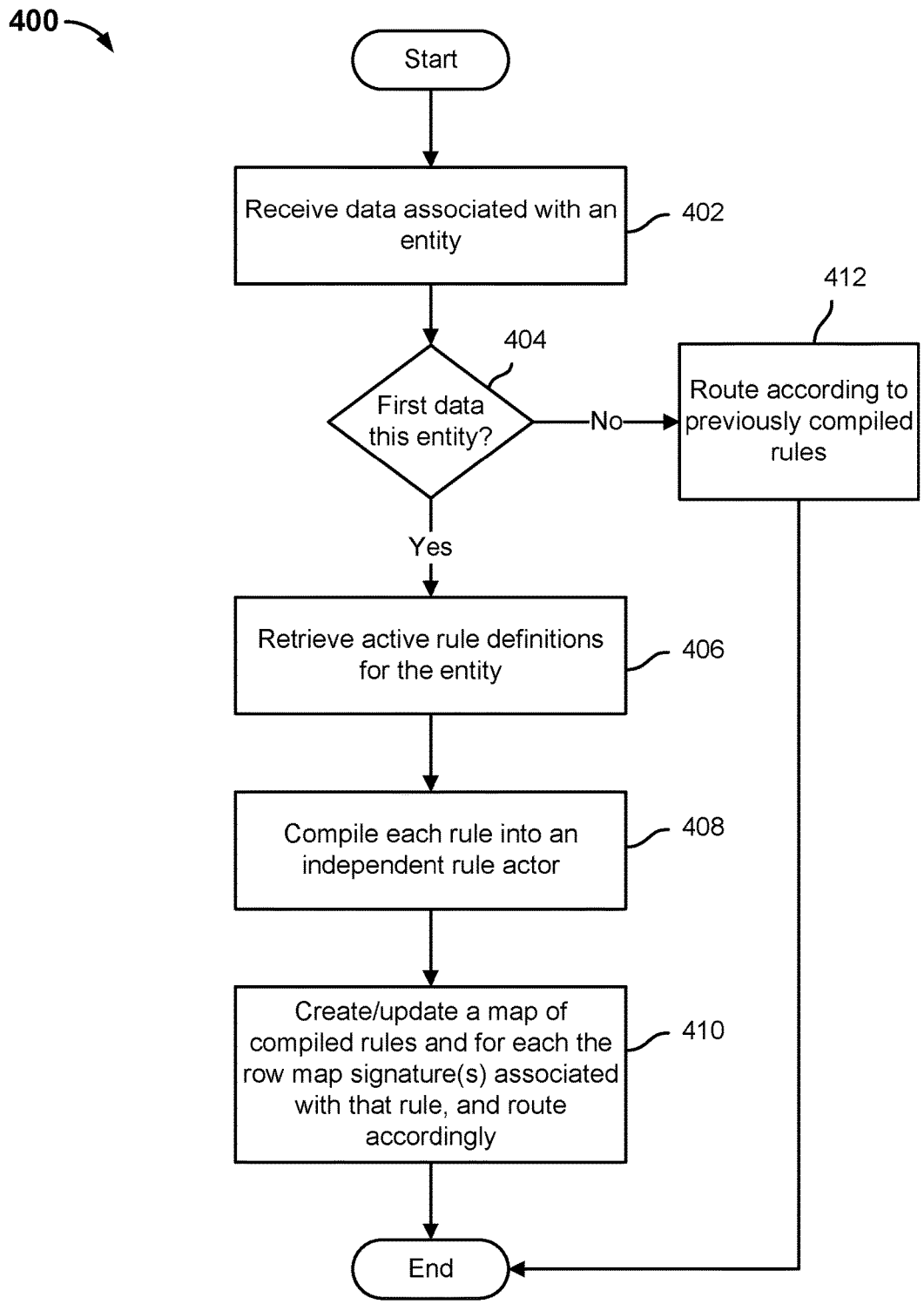
FIG. 4 is a flow chart illustrating an embodiment of a process to provide a message bus-based streaming rule engine.

FIG. 4 is a flow chart illustrating an embodiment of a process to provide a message bus-based streaming rule engine. In various embodiments, process 400 of FIG. 4 is performed by a loader/compiler/parser, such as LCP 104 of FIG. 1. In the example shown, data associated with an entity is received (402). In various embodiments, the entity may be an enterprise, an OEM or other manufacturer, a model, an installed system, a tenant of a multi-tenant log data analysis center, system, or service, etc. If the received data (402) is the first data associated with this entity that has been received (404), active rule definitions associated with the entity are retrieved (406) (e.g., read from storage); each rule definition is compiled into an independent rule actor (408); and a map of compiled rules, and for each the row map signature(s) associated with the rule, is created and/or updated (410). In some embodiments, the row map signature(s) are determined based on the rule definition, such as the definition 304 of values needed to evaluate the rule in rule definition 302 of FIG. 3. In some embodiments, the map of rules and associated rule signatures is stored and/or reflected in a hash map, such as hash map 114 of FIG. 1, used to configure a router, such as router 112 of FIG. 1, to route row maps to rule actors configured to use data comprising those row maps to evaluate the respective rules the rules actors are configured to implement and apply.

If received data (402) is not the first data that has been received for the entity (404), that is, the associated rules have already been compiled and rule actors to apply the rules instantiated, then the received data (402, 404) is routed (412) to interested rule actors according to the previously compiled rule definitions.

Figures 5, 6:
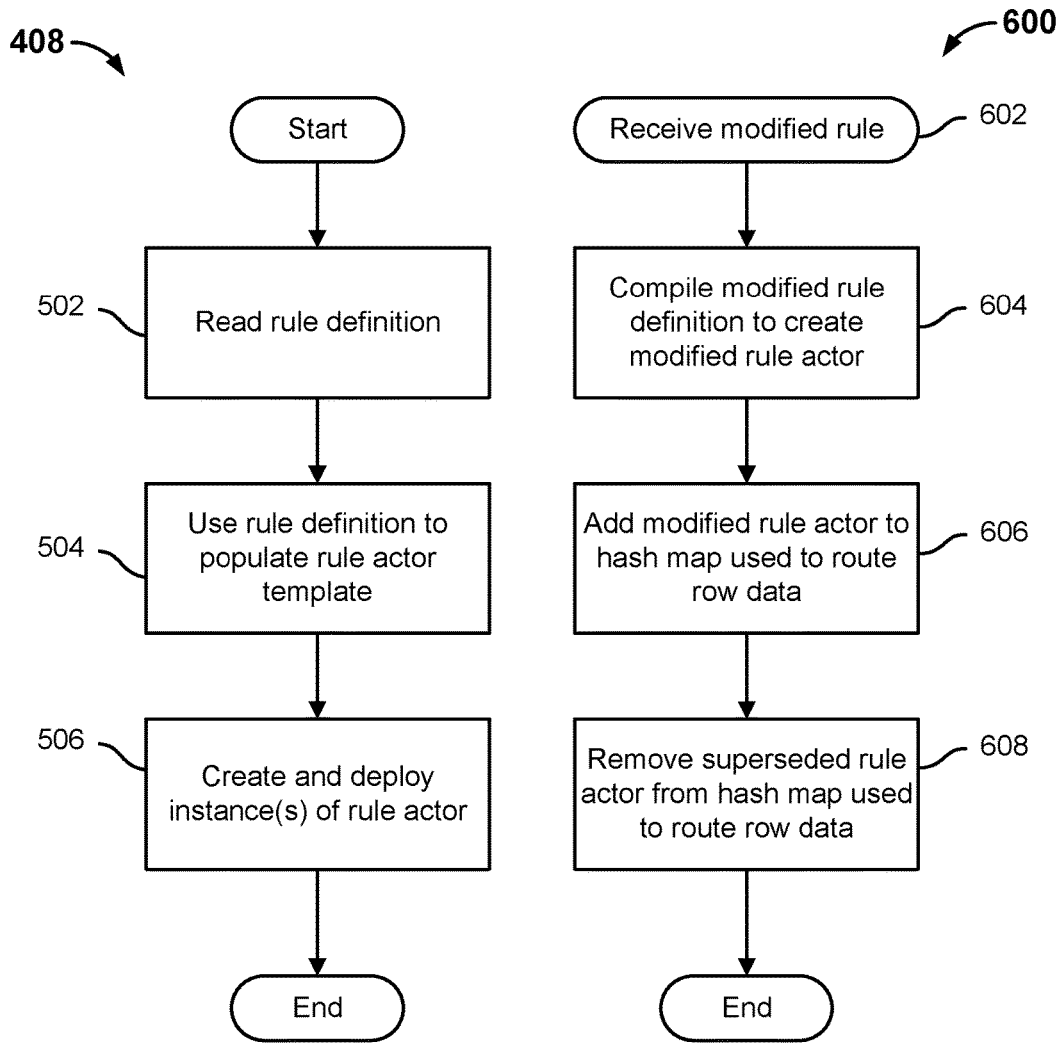
FIG. 5 is a flow chart illustrating an embodiment of a process to provide an independent actor to apply a rule in the context of a message bus-based streaming rule engine.
FIG. 6 is a flow chart illustrating an embodiment of a process to receive and deploy a modified rule.

FIG. 5 is a flow chart illustrating an embodiment of a process to provide an independent actor to apply a rule in the context of a message bus-based streaming rule engine. In various embodiments, step 408 of process 400 of FIG. 4 comprises the process of FIG. 5. In the example shown, the rule definition is read (502). The rule definition is used to populate a rule actor template (504). In some embodiments, populating the rule actor template (504) based on the rule definition (502) creates an actor class that defines attributes and methods to implement the rule as specified in the rule definition. One or more instances of the rule actor are created and deployed (506), e.g., rule actors 118, 120, and 122 in the example shown in FIG. 1.

FIG. 6 is a flow chart illustrating an embodiment of a process to receive and deploy a modified rule. In various embodiments, rules may be modified and deployed at any time, without interfering with the ongoing application of other rules by rule actors associated with rule definitions that have not been modified. In the example shown, a modified rule is received (602). For example, a modified rule definition expressed in an external DSL may be received, e.g., via a user interface, and converted to an internal DSL representation. The modified rule definition is compiled to create a modified rule actor (604). The modified rule actor is added to the hash map (or other data structure or repository), e.g., hash map 114 of FIG. 1, to route row data (e.g., row maps) to the modified rule actor (606). The rule superseded by the modified rule definition is removed from the hash map (608) and the corresponding actor instance(s) is/are removed.

In various embodiments, the ability to deploy modified rules without taking the data analysis system out of service provides the ability for end users to tweak triggering conditions (e.g., alert threshold), responsive actions, alert text, etc., without disrupting the application of other rules and/or the processing of row maps or other data not affected by the rule modification.

Figure 7:
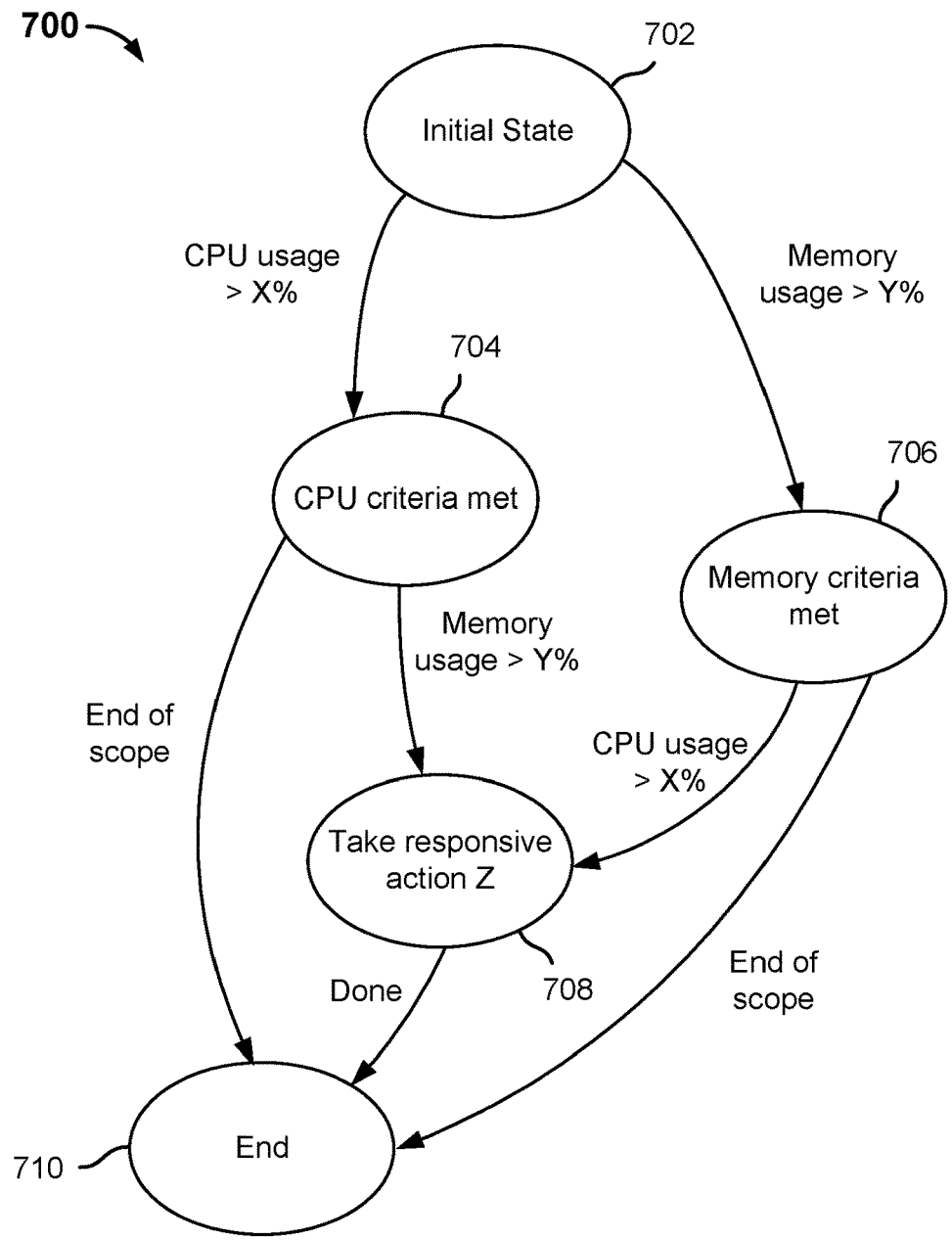
FIG. 7 is a state diagram illustrating an example of a finite state machine (FSM) to implement a rule in an embodiment of a message bus-based streaming rule engine.

FIG. 7 is a state diagram illustrating an example of a finite state machine (FSM) to implement a rule in an embodiment of a message bus-based streaming rule engine. In various embodiments, a rule actor as disclosed herein embodies and implements a finite state machine such as the exemplary FSM shown in FIG. 7 to implement and apply a rule to a given set of data, such as a row map.

A finite state machine (FSM) is conceived as an abstract machine that can be in one of a finite number of states. The machine is in only one state at a time; the state it is in at any given time is called the current state. It can change from one state to another when initiated by a triggering event or condition; this is called a transition. A particular FSM is defined by a list of its states, and the triggering condition for each transition.

In the example shown in FIG. 7, the FSM 700 implements a rule defined by a user to trigger a responsive action Z if the CPU usage exceeds X% and memory usage exceeds Y% within a defined scope, such as a prescribed period of time. The FSM 700 starts in an initial state 702 in which a row map matching a row signature associated with the rule actor implementing FSM 700 is received. For example, the row map may include one or both of a CPU usage value and a memory usage value for a given computer or other processing system. If the CPU usage value is greater than the prescribed CPU usage threshold, X% in this example, the FSM 700 transitions into the "CPU criteria met" state 704. If the memory usage value is greater than the prescribed memory usage threshold, Y% in this example, the FSM 700 transitions into the "memory criteria met" state 706. If while in the "CPU criteria met" state 704 or the "memory criteria met" state 706 the FSM 700 reaches the end of its scope, as defined in its rule definition, the FSM 700 transitions to the end state 710 and the instance of FSM 700 terminates. If while in the "CPU criteria met" state 704 the memory usage criteria is determined to have been met as well, prior to the end of scope, or while in the "memory criteria met" state 706 the CPU usage criteria is determined to have been met as well, the FSM transitions to the "take responsive action Z" state 708. For example, while in the "CPU criteria met" state 704 or the "memory criteria met" state 706, a subsequent row map relating to the same computer or other processing system may have been received with a value for the memory usage or CPU usage indicating that the remaining trigger condition has been met. In various embodiments, entry into the "take responsive action Z" state 708 triggers a responsive action as defined in the corresponding rule definition, such as by sending an alert with text or other content as indicated in the rule definition. Once the responsive action has been taken (708) the FSM 700 transitions to the end state 710.

As the example shown in FIG. 7 illustrates, techniques disclosed herein enable complex rules, including compound rules that require more than one triggering condition to be met before responsive action is taken, may be defined readily even by a less sophisticated user. In addition, rules may be defined to be applied based on context variables and/or within a defined temporal or other scope. Furthermore, rules may depend on context data observed over a relatively long period of time, with reference data required to apply such a rule being cached automatically, e.g., persisted distributed cache 126 of FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A data analysis system, comprising:
a communication interface configured to receive log data; and
a processor coupled to the communication interface and configured to:
parse the log data to generate a data unit comprising a data value; and
send the data unit via a message bus to a rule actor configured to apply a rule based at least in part on the data value;
wherein:
the rule actor comprises one of a plurality of rule actors each associated with a corresponding rule;
each rule actor is configured to implement a corresponding rule based at least in part on a rule definition; and
the processor is further configured to compile the rule definition, including by creating a class based on which the rule actor is instantiated.

2. The system of claim 1, wherein the rule actor is configured to apply the rule at least in part by comparing the data value to a threshold.

3. The system of claim 1, wherein the data unit comprises a row map.

4. The system of claim 1, wherein the data unit is routed to the rule actor based at least in part on the presence of the data value in the data unit.

5. The system of claim 1 wherein the rule definition is user-defined.

6. The system of claim 1, wherein the rule definition is express in an external domain specific language.

7. The system of claim 6, wherein the processor is configured to translate the rule definition into an internal domain specific language.

8. A data analysis system, comprising:
a communication interface configured to receive log data; and
a processor coupled to the communication interface and configured to:
parse the log data to generate a data unit comprising a data value; and
send the data unit via a message bus to a rule actor configured to apply a rule based at least in part on the data value;
wherein compiling the rule definition includes configuring a router to route the data unit to the rule actor based at least in part on the presence of the data value in the data unit.

9. A data analysis system, comprising:
a communication interface configured to receive log data; and
a processor coupled to the communication interface and configured to:
parse the log data to generate a data unit comprising a data value; and
send the data unit via a message bus to a rule actor configured to apply a rule based at least in part on the data value;
wherein the rule actor is based at least in part on a rule definition and wherein the processor is configured to receive a modified version of the rule definition and to replace the rule actor with a modified rule actor based on the modified version of the rule definition.

10. The system of claim 1, wherein the rule actor implements a finite state machine to apply the rule.

11. The system of claim 1, wherein the rule actor is configured to take a responsive action based at least in part on a determination that a trigger condition of the rule has been met.

12. The system of claim 11, wherein the trigger condition comprises a determination that the data value satisfies a threshold.

13. A method to analyze log data, comprising:
receiving log data via a communication interface;
using a processor coupled to the communication interface to:
parse the log data to generate a data unit comprising a data value; and
send the data unit via a message bus to a rule actor configured to apply a rule based at least in part on the data value
wherein:
the rule actor comprises one of a plurality of rule actors each associated with a corresponding rule;
each rule actor is configured to implement a corresponding rule based at least in part on a rule definition; and
the method further includes using the processor to compile the rule definition, including by creating a class based on which the rule actor is instantiated.

14. The method of claims 13, wherein compiling the rule definition includes configuring a router to route the data unit to the rule actor based at least in part on the presence of the data value in the data unit.

15. The method of claims 13, wherein the rule actor is based at least in part on a rule definition and wherein the processor is configured to receive a modified version of the rule definition and to replace the rule actor with a modified rule actor based on the modified version of the rule definition.

16. The method of claims 13, wherein the rule actor implements a finite state machine to apply the rule.

17. A computer program product to analyze log data, the computer program product being embodied in a non-transitory computer readable medium and comprising computer instructions for:
receiving log data;
parsing the log data to generate a data unit comprising a data value; and
sending the data unit via a message bus to a rule actor configured to apply a rule based at least in part on the data value;
wherein:
the rule actor comprises one of a plurality of rule actors each associated with a corresponding rule;
each rule actor is configured to implement a corresponding rule based at least in part on a rule definition; and
the computer program product further includes computer instructions to compile the rule definition, including by creating a class based on which the rule actor is instantiated.

18. The computer program product of claims 17, wherein compiling the rule definition includes configuring a router to route the data unit to the rule actor based at least in part on the presence of the data value in the data unit.

19. The computer program product of claims 17, wherein the rule actor is based at least in part on a rule definition and wherein the processor is configured to receive a modified version of the rule definition and to replace the rule actor with a modified rule actor based on the modified version of the rule definition.

20. The computer program product of claims 17, wherein the rule actor implements a finite state machine to apply the rule.

* * * * *